(12) United States Patent
Singh et al.

(10) Patent No.: US 9,353,659 B2
(45) Date of Patent: May 31, 2016

(54) TRAPPED SOOT ESTIMATOR

(75) Inventors: Navtej Singh, Lombard, IL (US); Adam C. Lack, Willow Springs, IL (US); Gregory Patrick Novak, Aurora, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 0 days.

(21) Appl. No.: 14/240,561

(22) PCT Filed: Aug. 25, 2011

(86) PCT No.: PCT/US2011/049091
§ 371 (c)(1),
(2), (4) Date: Feb. 24, 2014

(87) PCT Pub. No.: WO2013/028195
PCT Pub. Date: Feb. 28, 2013

(65) Prior Publication Data
US 2014/0230412 A1    Aug. 21, 2014

(51) Int. Cl.
*F01N 3/00* (2006.01)
*F01N 3/021* (2006.01)
*F01N 9/00* (2006.01)
*F01N 11/00* (2006.01)
*F02D 41/14* (2006.01)

(52) U.S. Cl.
CPC ............... *F01N 3/021* (2013.01); *F01N 9/002* (2013.01); *F01N 11/005* (2013.01); *F01N 2900/04* (2013.01); *F01N 2900/1606* (2013.01); *F02D 2041/1417* (2013.01); *F02D 2200/0812* (2013.01); *Y02T 10/47* (2013.01)

(58) Field of Classification Search
CPC ....... F01N 9/002; F01N 3/0842; F01N 3/035; F01N 13/02; F02D 41/029; F02D 29/02; F02D 28/00; F02D 2200/101; F02D 2041/1432; F02D 2041/1433
USPC ................... 60/274, 285, 286, 297, 295, 311; 701/101, 102
See application file for complete search history.

(56) References Cited

U.S. PATENT DOCUMENTS

| | | | | |
|---|---|---|---|---|
| 7,065,960 | B2* | 6/2006 | Gioannini et al. | 60/295 |
| 7,254,940 | B2* | 8/2007 | Saitoh et al. | 60/295 |
| 7,458,206 | B2* | 12/2008 | Yahata et al. | 60/297 |
| 7,603,252 | B2* | 10/2009 | Lee et al. | 702/155 |
| 8,332,124 | B2* | 12/2012 | George et al. | 701/102 |
| 2006/0032217 | A1* | 2/2006 | Kondou et al. | 60/297 |
| 2008/0097678 | A1* | 4/2008 | Huelser et al. | 701/101 |
| 2010/0126145 | A1* | 5/2010 | He et al. | 60/286 |

* cited by examiner

*Primary Examiner* — Patrick Maines
(74) *Attorney, Agent, or Firm* — Jack D. Nimz; Jeffrey P. Calfa

(57) ABSTRACT

A diesel engine (10) has an exhaust system (16) containing a diesel particulate filter (18) for trapping soot passing through the exhaust system as the engine operates. A trapped soot estimator (30) estimates soot trapped in the diesel particular filter by repeatedly executing an algorithm that calculates a data value for total soot trapped using Kalman filter processing (48) whose gain is controlled by at least one engine operating parameter.

9 Claims, 2 Drawing Sheets

TRAPPED SOOT ESTIMATOR

FIELD OF THE DISCLOSURE

This disclosure relates to diesel engines that have diesel particulate filters for filtering soot from exhaust passing through their exhaust systems. More particularly, the disclosure relates to an engine having an estimator for estimating the quantity of soot trapped in a diesel particulate filter as the engine runs.

BACKGROUND

Diesel engines are commonly used to propel large motor vehicles such as commercial trucks. An exhaust system of such a diesel engine that comprises a diesel particulate filter (DPF) is capable of physically trapping diesel particulate matter (DPM) in exhaust gas passing through the engine exhaust system. This prevents significant amounts of DPM from entering the atmosphere. Soot is one constituent of DPM. Other constituents include the soluble organic fraction (SOF) and ash (i.e. lube oil additives etc.). The trapping of soot by a DPF prevents what is sometimes seen as black smoke billowing from a vehicle's exhaust pipe.

Unless soot that has been trapped in a DPF is burned off by natural regeneration in sufficient quantity as an engine operates, the continued accumulation of trapped soot will eventually impede exhaust flow. In order to avoid this, regeneration of a DPF may be forced when the quantity of trapped soot has accumulated to some threshold level. One possible strategy for forcing regeneration of a DPF involves using the engine control system to adjust engine fueling in a way that elevates the exhaust temperature to a sufficiently high temperature to combust trapped soot. However, the use of added fuel to force regeneration diminishes the fuel economy of the vehicle that it propels.

The quantity of trapped soot can be monitored in order to ascertain if regeneration should be forced. However, because it is impractical to physically measure the mass of soot trapped in a DPF, the quantity is estimated. The mass of trapped soot can be estimated using an algorithm that processes data representing exhaust flow rate through the DPF and data representing differential pressure across the DPF.

SUMMARY OF THE DISCLOSURE

One generic aspect of the present disclosure relates to a diesel engine comprising: an exhaust system comprising a diesel particulate filter for trapping soot passing through the exhaust system as the engine operates and a trapped soot estimator for estimating soot trapped in the diesel particular filter comprising a processor for repeatedly executing an algorithm that calculates a data value for total soot trapped in the diesel particulate filter as the engine operates.

The algorithm is structured: a) to process data values for current engine speed and current engine torque for selecting from a steady-state soot estimation table containing data values of steady-state soot correlated with data values for engine speed and engine torque, a current data value for steady-state soot entering the diesel particulate filter, and for selecting from a transient soot estimation table containing data values of transient soot correlated with data values for engine speed and engine torque, a current data value for transient soot entering the diesel particulate filter; b) to calculate a current data value for a feed-forward instantaneous soot estimate by weighting the current data values for steady-state and transient soot as a function of changing engine operation, summing the weighted data values and subtracting a current data value for trapped soot being burned off by natural regeneration; c) and to repeatedly update a data value for a total soot estimate of soot trapped in the diesel particulate filter by adding to an existing data value for the total soot estimate the result of integrating a current data value for feed-forward instantaneous soot over a length of time since the prior update while also correcting the data value for total soot estimate by calculating a current data value for soot error between the current total soot estimate and a data value for trapped soot based on current exhaust flow and current differential pressure across the diesel particulate filter and processing the current data value for soot error by Kalman filter processing whose gain is controlled by at least one parameter related to engine operation.

Another generic aspect relates to the method that is described in the immediately preceding paragraph.

The foregoing summary, accompanied by further detail of the disclosure, will be presented in the Detailed Description below with reference to the following drawings that are part of this disclosure.

DETAILED DESCRIPTION

Figure 1:
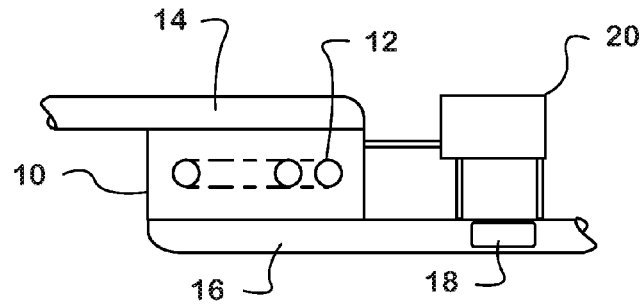
FIG. 1 is a schematic diagram of portions of a diesel engine.

FIG. 1 shows a diesel engine 10 that is representative of one that is used as the motor of a motor vehicle such as a commercial truck. Engine 10 comprises engine cylinders 12 within which fuel is combusted with air that has entered through an intake system 14. Products of combustion coming from engine cylinders 12 form exhaust that is conveyed through an exhaust system 16 containing a diesel particulate filter (DPF) 18 for trapping soot as the exhaust passes through DPF 18 on its way to a tailpipe through which the exhaust exits.

Engine 10 also comprises a processor-based engine control system 20 that processes data from various sources to develop various control data for controlling various aspects of engine operation. The data processed by the control system may originate at external sources, such as sensors, and/or be generated internally. Differential pressure across DPF 18, temperature of DPF 18, and the exhaust flow rate through exhaust system 16 are two examples of such data.

Figure 2:
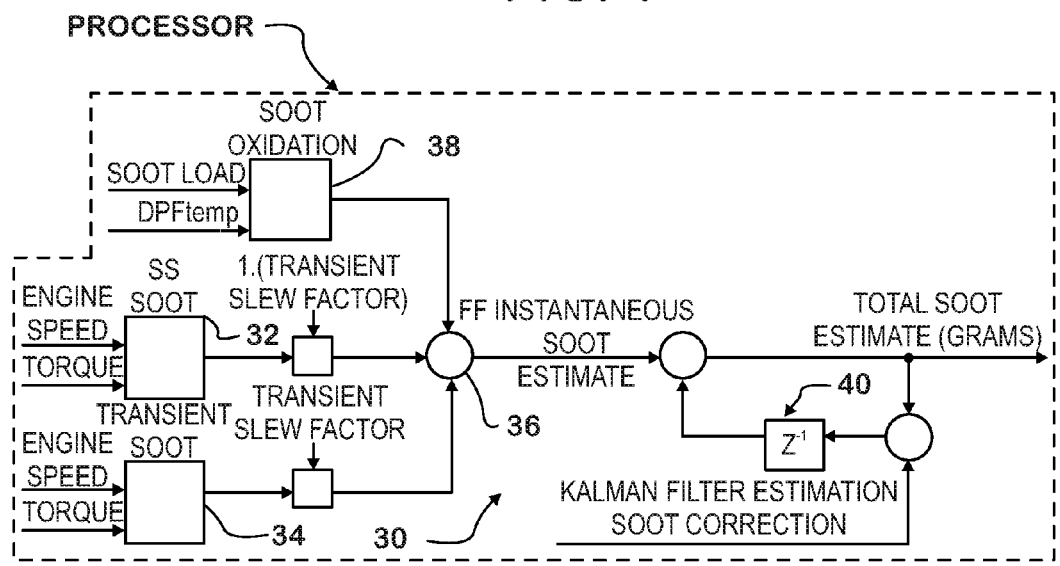
FIG. 2 is a first portion of schematic diagram of a trapped soot estimator.
Figure 3:
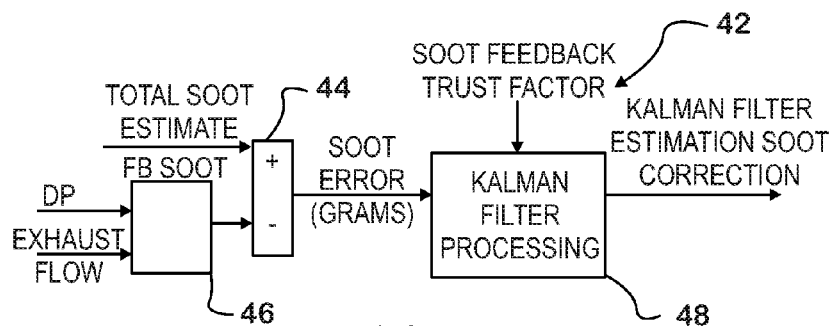
FIG. 3 is a second portion of the schematic diagram.
Figure 4:
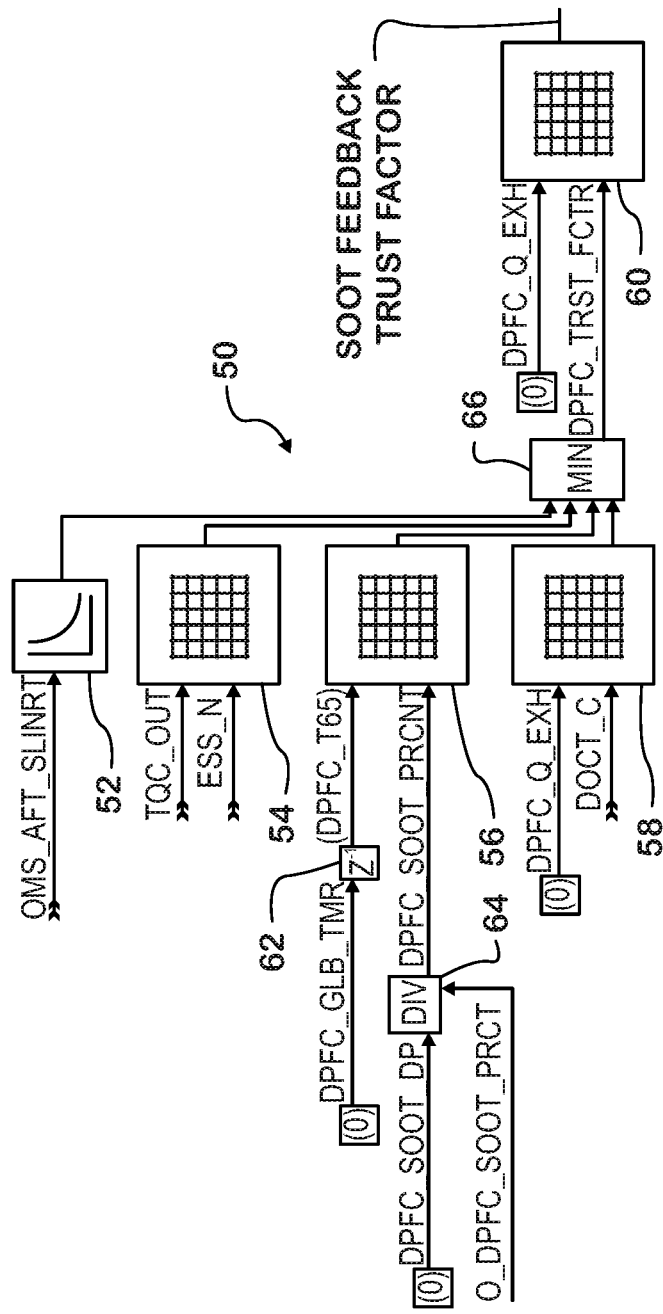
FIG. 4 is a second portion of the schematic diagram.

FIGS. 2, 3, and 4 collectively show a trapped soot estimator 30 for estimating soot trapped in DPF 18. Trapped soot estimator 30 is embodied as an algorithm in engine control system 20 that is repeatedly executed.

Data that is processed by trapped soot estimator 30 include Engine Speed data representing engine speed, Torque data based on engine fueling (which correlates with engine torque), Soot Load data representing the quantity of soot currently trapped in DPF 18, DPFtemp data representing the temperature of DPF 18, DP data representing differential pressure across DPF 18, and Exhaust Flow data representing the exhaust flow rate through exhaust system 16.

FIG. 2 shows trapped soot estimator 30 to comprise a steady state soot estimation look-up table 32 (SS Soot) and a transient soot estimation look-up table 34 (Transient Soot). Table SS Soot 32 has been populated with steady state data values for soot being conveyed through exhaust system 16 from engine cylinders 12 toward DPF 18 as engine 10 operates, and table Transient Soot 34 has been populated with transient data values for soot being conveyed through exhaust system 16 from engine cylinders 12 toward DPF 18 as engine 10 operates. The populating data values in each table may be obtained empirically as a function of Engine Speed and Torque by operating engine 10 or an equivalent development engine at various combinations of engine speed and torque.

As engine 10 runs, some of the soot coming from engine cylinders 12 is trapped in DPF 18, and data values for Engine Speed and Torque are used to select a steady state soot data value from table SS Soot 32 and a transient soot data value from table Transient Soot 34.

A transient slewing factor (Transient Slew Factor) is applied to the selected transient soot data value from table Transient Soot 34, and a steady state slewing factor (1−Transient Slew Factor) is applied to the selected steady state soot data value from table SS Soot 32. The value for Transient Slew Factor (TSF) can range from 0.00 to 1.00 and is based on whether engine 10 is running in a steady state mode (engine speed and torque essentially constant) or a transient mode (engine speed and/or torque changing).

A data value for TSF is based on severity of an engine transient. Severity is determined by how fast engine fueling (i.e. torque) and/or engine speed is (or are) changing. Faster change represents higher severity and slower change slower severity. In a steady state mode, TSF has a value 0.00. Hence, the use of slewing weights the data values from tables 32, 34 based on changing engine operation.

The slewed data values for transient soot and steady state soot are positive inputs to an algebraic summing function 36. A negative input to algebraic summing function 36 is provided by a data value from a soot oxidation look-up table 38.

Table 38 has been populated with transient data values for trapped soot being burned off by natural regeneration of DPF 18 as engine 10 operates. The populating data values for table 38 may be obtained empirically as a function of Soot Load representing soot currently trapped in DPF 18 and DPFtemp representing current temperature of DPF 18.

Algebraic summing function 36 provides an output data value for a parameter FF Instantaneous Soot Estimate representing an estimate of a quantity of soot coming from engine cylinders 12 toward DPF 18 at the time of the calculations performed by processing in engine control system 22 that has thus far been described.

As engine 10 operates, each data value for FF Instantaneous Soot Estimate is integrated by an integration function 40 over the time interval that has elapsed since the prior iteration produced an immediately preceding data value for FF Instantaneous Soot Estimate. Integration function 40 accumulates these values to provide a data value for Total Soot Estimate representing total quantity of soot trapped in DPF 18.

Trapped soot estimator 30 also processes a data value for a Kalman Filter Estimation Soot Correction to correct each calculation of the Total Soot Estimate. FIG. 3 shows a Kalman filter 42 that calculates a data value for the Kalman Filter Estimation Soot Correction.

A data value for Soot Error is calculated by a subtraction function 44 that subtracts from the current data value for Total Soot Estimate, a data value selected from a look-up table FB Soot 46 using current data values for DP and Exhaust Flow. The populating data values for table FB Soot 46 may be obtained by empirical measurements as a function of differential pressure across DPF 18 and flow rate of exhaust through exhaust system 16 as engine 10, or an equivalent development engine, operates under various conditions. At each iteration of the algorithm, Kalman Filter Processing 48 processes the data value for Soot Error from table FB Soot 46 using Kalman filter equations, parameters for which are determined by a Soot Feedback Trust Factor (SFT Factor).

In theory, the use of a data value for DP and a data value for Exhaust Flow to calculate a quantity of trapped soot in the DPF would produce the precise quantity trapped if those data values represented perfect measurements. In practice, those data values are subject to some degree of error that is inherent in the measurement or estimation of any physical property of a dynamic system. Because data values are being repeatedly taken as the engine operates, the degree of error in each will vary, with some being more precise and others less precise. Consequently some iterations of the algorithm will yield data values for Soot Error that are relatively more precise while other iterations of the algorithm will yield data values for Soot Error that are relatively less precise.

Each data value for Soot Error is a feedback input to Kalman filter processing 48 for correcting the data value for Total Soot Estimate. What the SFT Factor does is to set the gain of the filter by assigning a probability to the accuracy of the Soot Error calculation. To the extent that the probability of accuracy is larger, the more that the calculated data value for Kalman Filter Estimation Soot Correction is allowed to correct the data value for Total Soot Estimate (i.e. the higher the filter gain). Similarly, to the extent that the probability of accuracy assigned by the SFT Factor is smaller, the less that the calculated data value for Kalman Filter Estimation Soot Correction is allowed to correct the data value for Total Soot Estimate (i.e., the lower the filter gain).

Determination of the SFT Factor is a function of at least one engine operating parameter, examples of which include: transient operation of the engine, engine speed, engine torque, DPF regeneration status and quality, exhaust flow rate, and exhaust temperature.

FIG. 4 shows a strategy 50 for calculating the SFT Factor. Briefly, the SFT Factor can have a value as low as 0.00 and a value as high as 1.00, and the higher the value, the more the soot feedback should be trusted.

Strategy 50 comprises five look-up tables 52, 54, 56, 58, and 60.

Look-up table 52 is populated with values for the SFT Factor correlated with data values for a parameter OMS_AFT_SLINRT. When engine 10 is operating in a steady state condition, the data value for OMS_AFT_SLINRT selects a value of 1.00 for the SFT Factor. When engine 10 is operating in a transient condition, the data value for OMS_AFT_SLINRT selects a value smaller than 1.00 for the SFT Factor. The more extreme the transient, the smaller the value selected for the SFT Factor.

Look-up table 54 is populated with values for the SFT Factor correlated with sets of data values for the parameters TQC_OUT and ESS_N. Parameter TQC_OUT is indicative of engine torque and parameter ESS_N is indicative of engine speed. When engine 10 is operating in lower torque and lower speed ranges, the data values for TQC_OUT and ESS_N select relatively lower values for the SFT Factor. As torque and speed increase, the data values for TQC_OUT and ESS_N select increasingly larger values for the SFT Factor.

Look-up table 56 is populated with values for the SFT Factor correlated with sets of data values for the parameters DPFC_T65 and DPFC_SOOT_PRCNT. Parameter DPFC_T65 is indicative of elapsed time of an on-going regeneration of DPF 18, a time that is obtained by integrating (function 62) a parameter DPFC_GLB_TMR that indicates regeneration is occurring. Parameter DPFC_SOOT_PRCNT is indicative of the quantity of soot currently trapped in DPF 18 (as a percentage, or fraction, of the maximum quantity that DPF can trap) and is obtained by dividing (function 64) the value of a parameter DPFC_SOOT_DP (differential pressure across the DPF) by the value of a parameter C_DPFC_SOOT_PRCT to obtain a percentage or fraction. At the onset of regeneration and when the quantity of trapped soot is large, the data values for DPFC_T65 and DPFC_SOOT_PRCNT select relatively lower values for the SFT Factor. As regeneration proceeds, the data values for DPFC_T65 and DPFC_SOOT_PRCNT select increasingly larger values for the SFT Factor.

Look-up table 58 is populated with values for the SFT Factor correlated with sets of data values for the parameter DPFC_Q_EXH, representing exhaust flow rate, and the parameter DOCT_C, representing exhaust temperature. When exhaust flow rate and exhaust temperature are relatively low, the data values for DPFC_Q_EXH and DOCT_C select relatively lower values for the SFT Factor. At increasingly higher exhaust flow rates and increasingly higher exhaust temperatures, the data values for DPFC_Q_EXH and DOCT_C select increasingly larger values for the SFT Factor.

A minimum value selection function 66 selects the lowest of the SFT Factors selected from look-up tables 52, 54, 56, and 58 for the value of a parameter DPFC_TRST_FCTR. Look-up table 60 is populated with values for the SFT Factor correlated with sets of data values for parameters DPFC_TRST_FCTR and DPFC_Q_EXH, and selects a data value based on the lowest SFT Factor selected by minimum value selection function 66 and the exhaust flow rate. It is the data value selected by look-up table 60 that is used to set the gain in Kalman Filter Processing 48.

What is claimed is:

1. A diesel engine system comprising:
  a diesel engine which emits soot during its operation;
  an exhaust system comprising a diesel particulate filter disposed downstream from the diesel engine for trapping soot passing through the exhaust system as the diesel engine operates;
  a processor-based control system for estimating soot trapped in the diesel particulate filter as the diesel engine operates, wherein the processor-based control system is configured:
  a) to process data values for a current engine speed and a current engine torque for selecting from a steady-state soot estimation table containing data values of steady-state soot correlated with data values for the engine speed and the engine torque, a current data value for steady-state soot entering the diesel particulate filter, and for selecting from a transient soot estimation table containing data values of transient soot correlated with data values for the engine speed and the engine torque, a current data value for transient soot entering the diesel particulate filter;
  b) to calculate a current data value for a feed-forward instantaneous soot estimate by weighting the current data value for steady-state soot and the current data value for transient soot as a function of changing engine operation, summing the weighted data values and subtracting a current data value for trapped soot being burned off by natural regeneration;
  c) to repeatedly update a data value for a total soot estimate of soot trapped in the diesel particulate filter by adding to an existing data value for the total soot estimate the result of integrating a current data value for feed-forward instantaneous soot over a length of time since a prior or update while also correcting the data value for the total soot estimate by calculating a current data value for soot error between a current total soot estimate and a data value for trapped soot based on a current exhaust flow rate and a current differential pressure across the diesel particulate filter and processing the current data value for soot error by a Kalman filter processing gain; wherein the Kalman filter processing gain is controlled by at least one parameter related to engine operation; and
  d) to initiate regeneration of the diesel particulate filter when the data value for the total soot estimate reaches a predetermined value, thereby increasing a temperature of the diesel particulate filter to burn off soot trapped in the diesel particulate filter to reduce the impedance of the exhaust flow through the diesel particulate filter.

2. A diesel engine system as set forth in claim 1 further comprising a soot error table from which a current data value for soot error between the current total soot estimate and a data value for trapped soot is obtained based on the current exhaust flow rate and the current differential pressure across the diesel particulate filter.

3. A diesel engine system as set forth in claim 2, wherein the Kalman filter processing gain is a function of a selection, from a trust factor table, of a data value which estimates a probable accuracy of the current data value for soot error obtained from the soot error table.

4. A diesel engine system as set forth in claim 3, wherein the Kalman filter processing gain is an increasing function of one or more data value selections from the trust factor table which estimate increasingly probable accuracy of the current data value for soot error obtained from the soot error table.

5. A diesel engine system as set forth in claim 4, wherein the data value selected from the trust factor table is a function of the exhaust flow rate and of a minimum trust factor value selected from other trust factor tables.

6. A diesel engine system as set forth in claim 5, wherein one of the other trust factor tables is populated with trust factor data values correlated with engine transient operation.

7. A diesel engine system as set forth in claim 5, wherein one of the other trust factor tables is populated with trust factor data values correlated with engine torque and engine speed.

8. A diesel engine system as set forth in claim 5, wherein one of the other trust factor tables is populated with trust factor data values correlated with an elapsed time of an ongoing regeneration of the diesel particulate filter and a quantity of soot trapped in the diesel particulate filter.

9. A diesel engine system as set forth in claim 5, wherein one of the other trust factor tables is populated with trust factor data values correlated with the exhaust flow rate and exhaust temperature.

* * * * *